INVENTORS.
ADAM A. JORGENSEN
ARTHUR B. CIESLAK
ROBERT W. BENTLEY
BY Hofman Stone
ATTORNEY

United States Patent Office 3,445,728
Patented May 20, 1969

3,445,728
REED RELAY ASSEMBLY
Adam A. Jorgensen, Pittsford, Arthur B. Cieslak, Rochester, and Robert W. Bentley, Penfield, N.Y., assignors to Stromberg-Carlson Corporation, Rochester, N.Y., a corporation of Delaware
Filed Jan. 3, 1967, Ser. No. 607,016
Int. Cl. H02b *1/04;* H01h *1/66*
U.S. Cl. 317—113                                                7 Claims

ABSTRACT OF THE DISCLOSURE

A read relay module including comb-shaped printed circuit cards with the teeth of the comb extending into coil bobbins for aligning them. The bobbins abut edge portions of the cards adjacent to the roots of the teeth, with the major axes of the coils in the planes of the cards. Terminal lugs are mounted on the cards for receiving the tongues of the reeds, which are straight, thus facilitating assembly by avoiding the need to orient the reeds.

---

This invention relates to a novel electromechanical switch assembly, and, more particularly, to a novel arrangement for mounting encapsulated reed switches on a printed circuit card, the arrangement being especially well suited for manufacture and assembly of the components by highly automated mass production techniques and at relatively low cost.

Reed relays of the type with which the present invention is concerned generally include a pair of electrical conductors made of a magnetic material sealed with an elongated envelope of glass or other insulating material. Terminal portions of the conductors are sealed through the ends of the envelope and extend therefrom for connecting the conductors in an external circuit. The conductors are normally positioned slightly out of alignment with each other in the envelope, with their adjacent end portions overlapping and slightly spaced apart. When a magnetic field is applied, the adjacent end portions of the conductors are brought into contact with each other, thereby completing an electrical connection between the terminals.

For the purpose of operating the reeds, they may be mounted within an electrical coil generally parallel to the axis upon which the coil is wound. Typical arrangements of this type are shown in U.S. Patents Nos. 3,089,010 and 3,114,019 both issued to A. J. Koda.

Arrangements of this type are highly advantageous as compared especially with relays of the type heretofore widely used in telephone switching systems. They may be made very compact; their contacts are hermetically sealed and are not subject to contamination by dust, or to corrosion by the ambient atmosphere; they may be actuated by relatively small applied energies; and the reed switches may be manufactured very inexpensively by highly automatic machinery.

One of the major problems with relays of this type, which has been the subject of a great deal of investigation heretofore, has been the problem of reducing the cost of assembling an array, or matrix of reed switches and their actuating coils, particularly toward the end of minimizing the amount of hand labor required.

Accordingly, one important object of the present invention is to provide a novel reed relay assembly which is particularly well adapted for highly automated production and which requires very few or no hand operations in its manufacture.

The invention will now be described in greater detail in connection with the accompanying drawings, wherein.

Briefly, in accordance with a first embodiment of the invention, the reed switches and other circuit components are not mounted directly upon the printed circuit cards, but upon lugs which are fixed to the card as by staking and extend from it into planes spaced from and parallel to the major faces of the card. The arrangement is such as to permit all of the leads of the various elements assembled to the card to be made straight, to minimize alignment and positioning problems, and to allow all connections to be soldered by automatic dip soldering. Hand operations are completely, or very nearly completely eliminated.

The second embodiment of the invention achieves substantially all of the advantages of the first embodiment, and in addition, avoids the need to punch holes in the printed circuit cards to receive the terminal lugs. Instead of mounting lugs on the cards, terminal connectors are molded into the bobbins upon which the actuating coils are wound, and are shaped to engage printed circuit conduct pads on the cards when the coils are mounted thereon.

A further feature of the invention relates to mounting several printed circuit cards in parallel array between end panels to form a framework made up of printed circuit cards. Inter-connection between the various different panels constituting the parallel array are made through printed circuit conductors carried by the end panels, and, as shown, all connections to all of the several panels or cards may be made through a separate card, called the connector card, which constitutes also part of the framework, and which carries all the terminals for connecting the entire array to an external circuit.

The modules of the invention are well suited for manufacture almost entirely by automatic machinery, including not only assembly of the components on the printed circuit cards and assembly of the cards to form the framework, but also dip soldering for wetting the electrical connections, and for automatic welding of certain other connections.

Figure 1:
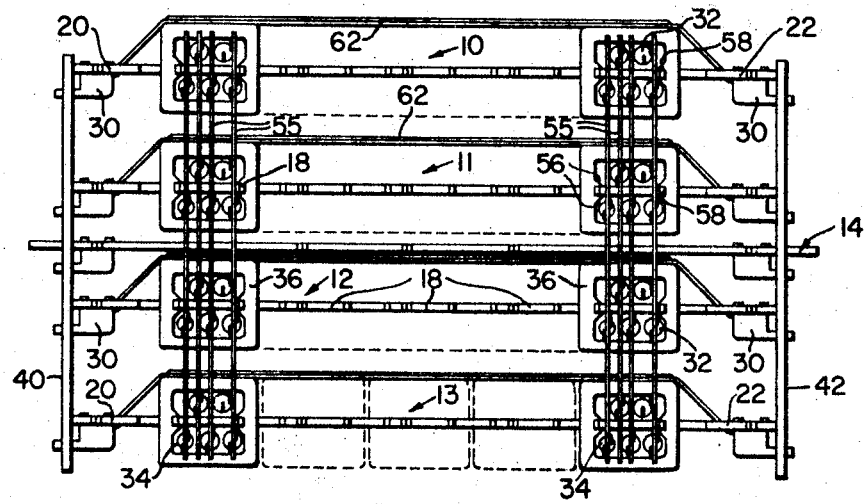
FIGURE 1 is a plan view of a switching module in accordance with a first embodiment of the invention, showing actuating coils in a 5 x 4 array.
Figure 2:
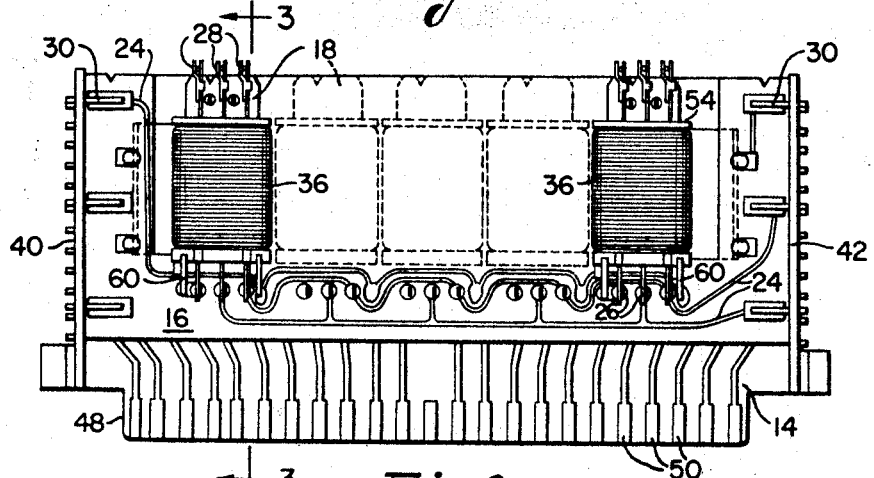
FIGURE 2 is a side elevational view of the module shown in FIGURE 1.
Figure 3:
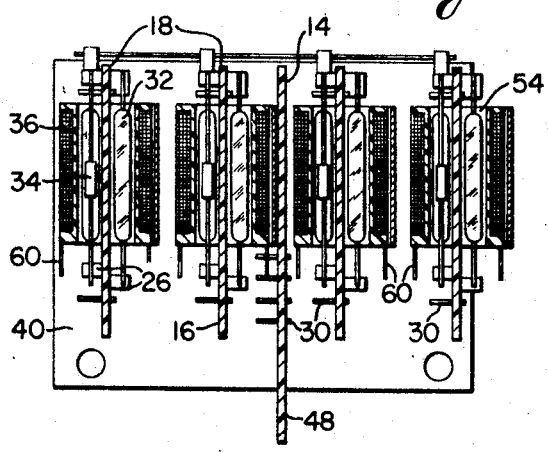
FIGURE 3 is a cross-section taken along the line 3—3 of FIGURE 2.
Figure 4:
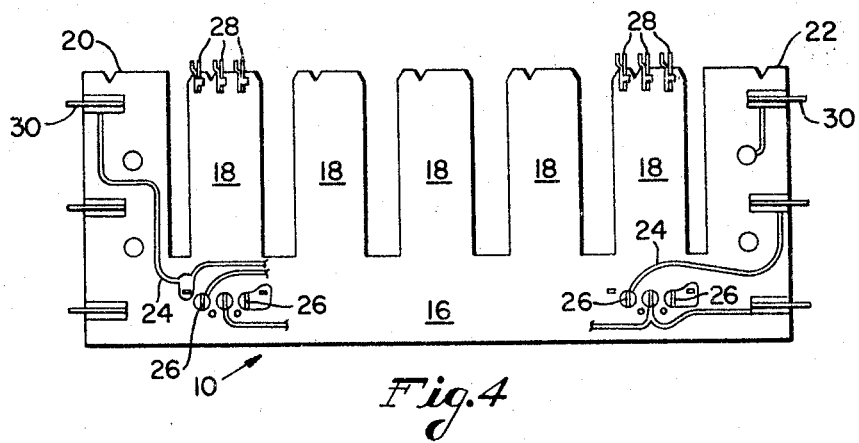
FIGURE 4 is an elevational view of a printed circuit card that forms one member of the basic frame of the module show in FIGURES 1–3, showing the card with the coils, glass reed switches, and other circuit components removed, and including only a fragmentary showing of the printed circuit pattern.
Figure 5:
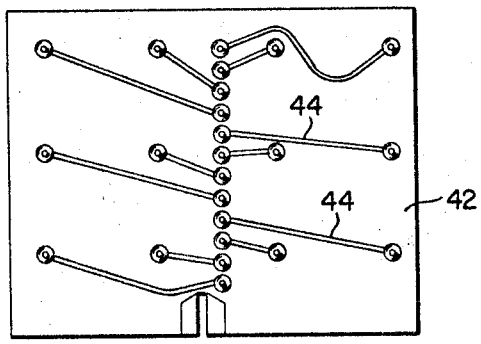
FIGURE 5 is an elevational view of a printed circuit card that forms an end wall of the framework.

Referring now to the drawings, the module shown in FIGURES 1–3 includes four printed circuit cards 10, 11, 12, and 13, of substantially identical construction. Each card is in the form of a comb, and includes a base strip portion 16, and five finger-like extensions 18 for supporting operating components of the system. Each of the cards 10–13 also includes a pair of end portions 20 and 22 spaced outwardly from the fingers 18 for supporting the cards in a framework. Printed circuit conductors 24 formed by any desired process are adherently secured to the cards 10–13 in a pattern determined according to the functions to be performed by the switching assembly and the nature of the circuit to be used for controlling the operation of the assembly. This is a matter that will vary in accordance with the designer's choice, and is not to be regarded as a limiting factor in the practice of the invention.

Conductive lugs 26, 28, and 30 are fixed to the cards 10–13, and extend from their major planes for receiving terminal wires or other parts of the electrical components of the array. The lugs 26, 28, and 30 not only effect electrical connections between the elements and the printed circuit conductors, but also mount the electrical elements physically and retain them in position. The lugs 26, 28, and 30 may be secured by any desired means such as, for example, by press fitting them into pre-punched holes in the cards and then twisting or bending them slightly to fix them firmly and rigidly in position upon the cards. This general type of attachment method will be referred to herein as staking.

Terminal wires of reed switches 32, diodes 34, actuating coils 36, and of any other electrical components it is desired to include in the circuit of the assembly are then crimped into the lugs and secured thereby. Certain ones 26 of the lugs are arranged adjacent to the edge of the base portions 16 of the cards. Other ones 28 of the lugs are arranged adjacent to the distal ends of the finger portions 18. The rest of the lugs 30 are arranged along the edges of the end portions 20 and 22 for making connections to the end panels 40 and 42. This arrangement facilitates dip soldering because all of the connections to be soldered are along the outer surfaces of the assembly, and they may all be immersed in the solder bath without having to immerse the operating coils or other sensitive parts of the assembly.

In the embodiment shown, four printed circuit cards 10–13 are mounted, together with a pair of end panels 40 and 42, and a connecting panel 14 to form a framework of printed circuit cards.

Conductors from each of the mounting cards 10–13 are brought out to the ends of the cards and connected through the lugs 30 to printed circuit conductors 44 carried on the end panels 40 and 42. Connections are also effected in similar manner between the conductors 44 on the end panels and conductors on the connector card 14. The end panels, therefore, effect connections between the conductors on the connector panel 14 and all of the mounting panels 10–13. The connector panel 14 includes an integral terminal strip portion 48, which extends preferably beyond the general bounds of the framework defined by the mounting cards 10–13 and the end panels 40 and 42. Terminal pads 50 of printed circuit construction are arrayed along the terminal strip 48 for effecting plug-in connections between the assembly and an external circuit.

Figure 8:
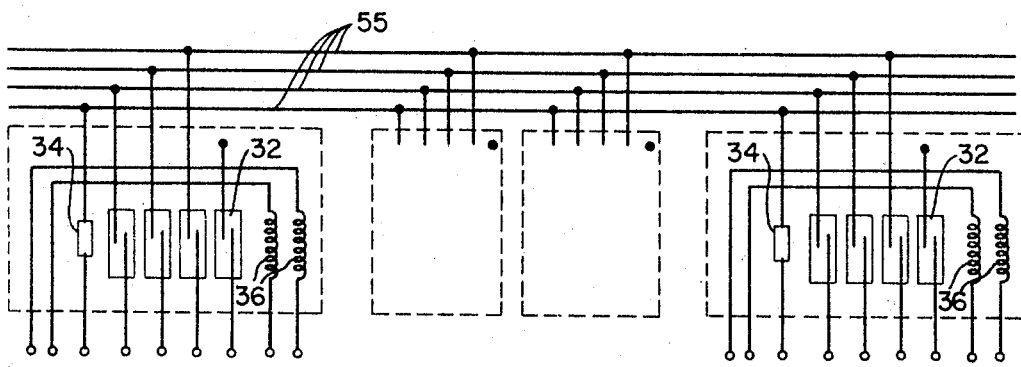
FIGURE 8 is a simplified fragmentary, schematic circuit diagram of a typical electrical circuit that may be used for selectively energizing the various coils of the module shown in FIGURES 1–3.
Figure 9:
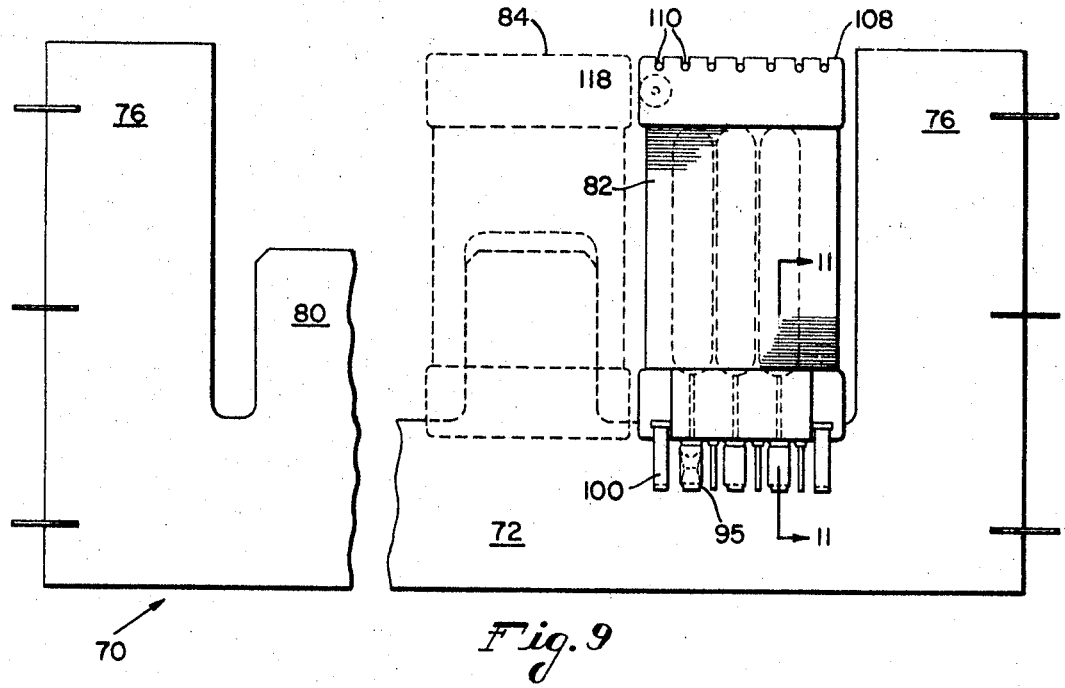
FIGURE 9 is an elevational view of a single panel, in partly disassembled form, of a reed relay module according to a second, and presently preferred embodiment of the invention.
Figure 10:
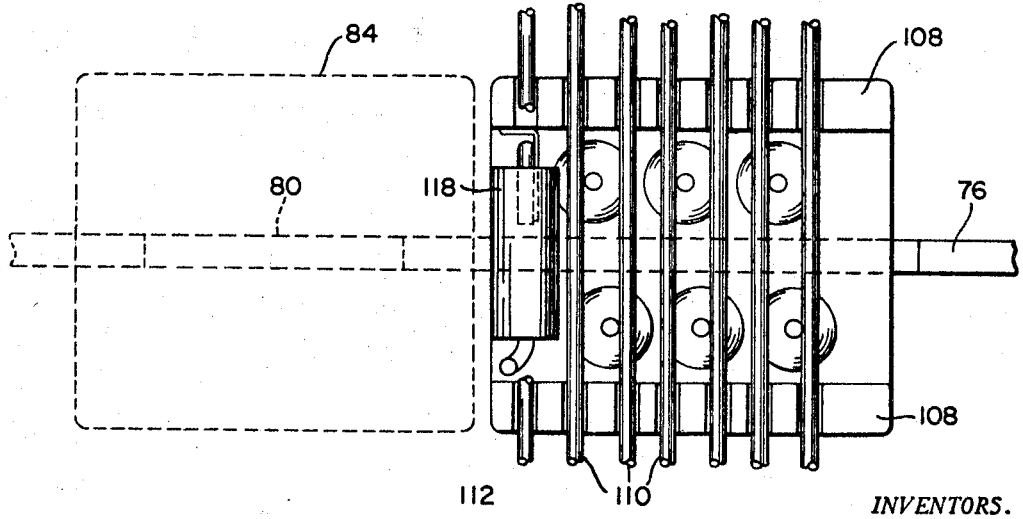
FIGURE 10 is a partly schematic, fragmentary plan view of the panel shown in FIGURE 9.

For fast operation coupled with maximum economy, each of the actuator coils 36 is preferably made, as indicated in the schematic diagram of FIGURE 8, with two windings. The first winding includes about half the number of turns included in the second winding. A large current is passed through the first winding of closing the reed contacts, and a smaller holding current can then be passed through the second winding for holding the contacts closed. This, however, is a matter of designer's preference in view of the operating characteristics desired.

As shown, the coils 36 are wound upon bobbins 54, which are molded with inwardly facing ridges 56 to define opposed grooves 58 extending axially along the bobbins. The edges of the fingers 18 of the mounting panels are received in the grooves 58 for guiding the bobbins and coils upon the fingers during assembly and for supporting them firmly in position thereon. This arrangement, also, facilitates automated production because the coils 36 may be completed prior to assembly, and their leads connected to relatively heavy and rigid terminal wires 60 which are fixed to the bobbins 54. The terminal wires 60 are shaped to come into pressure engagement with contact pad portions 61 of the printed circuit when the coils are mounted. The problem of making connections to the coils is thus greatly simplified.

As shown, the assembly includes four reed switches 32 and one diode 34 on each finger of each panel 10–13. Various different arrangements may be used as desired in accordance with the requirements for which the assembly is designed.

The lugs 28 at the distal ends of the fingers 18 are positioned to be connected by wires 55 laid in a straight harp-like array across them, further to simplify the assembly and connection of the assembly to an external circuit.

As shown, magnetic shields 62 are secured to the respective panels 10–13 and extend between the rows of coils 36 for preventing so-called cross-talk between the coils mounted on one of the cards 10–13 and those mounted on another. Other shielding arrangements are known in the art, and the particular arrangement chosen will depend upon the manner in which the assembly is to be operated.

In general, the cross-talk problem relates to the tendency of an energized coil to counteract the flux produced by an adjacent coil and thus to inhibit actuation of the reed switches that are supposed to repond to energization of the adjacent coil. In the operation presently contemplated for the assembly described herein, only one coil on each of the cards 10–13 is operated at any given time, and it is, therefore, not necessary to shield the coils individually, as would be desirable if more than one coil in each row were to be energized at the same time.

Figure 6:
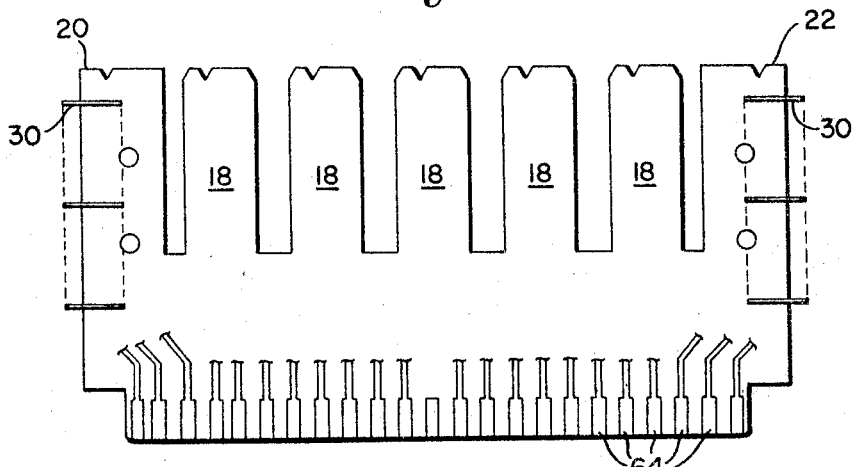
FIGURE 6 is an elevational view of a printed circuit card intended for use in a module according to an alternative, modified form of the invention.
Figure 7:
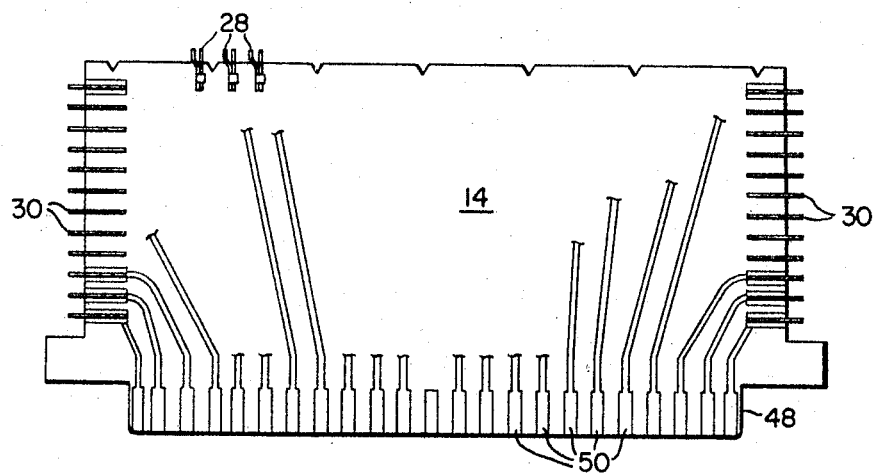
FIGURE 7 is an elevational view of a printed circuit card that forms the central panel of the framework in the module shown in FIGURES 1–3.

The practice of the invention also contemplates the provision of terminal pads 64 along the lower edges of the mounting panels 10–13, as shown in FIGURE 6, in which case the connector panel 14 may be omitted, and connections to the external circuit made through the terminal pads on the mounting panels themselves. In such cases, however, inter-connections between the various different mounting panels 10–13 would still be made through printed circuit conductors on the end panels 40 and 42 and through the harp-like array of wires 55.

The entire construction including all of the sub-components is well suited for automatic production. The reed switches themselves may be made of wire stock and glass tubing on easily devised fully automatic machinery, and, because the electrical components are mounted on the lugs 26 and 28 that extend from the planes of the cards, problems having to do with alignment and positioning of the components relative to the cards are avoided or minimized.

There is no need to bend the leads of the components, and then to orient them so the leads contact the mounting panels. Instead, the leads are left straight, and the lugs 26, 28, and 30 are notched, or otherwise shaped to guide the leads into their fully seated positions.

After assembly, the connections are preferably dip soldered in the conventional manner.

According to the second, and presently preferred embodiment of the invention, as shown in FIGURES 9–13, the electrical components such as the reed switches 32 and the diodes 118 are not mounted to the printed circuit cards, but instead they are positioned primarily by shaped recesses within the coil bobbins 84, and connections are made to them through individual contact lugs 90 that are molded or staked in the bottoms of the bobbins.

Referring now to FIGURES 9–12, the panel 70 shown therein includes a printed circuit card 72 for interconnecting the various actuating coils and circuit components. Although not specifically shown in the drawing, the panel 70 is intended to be arranged in conjunction with other similar panels to form a framework of printed circuit panels as described hereinabove in connection with the first embodiment. For that purpose, end terminal lugs 30 are secured to the card 72 extending outwardly from the edges of the end portions 76 thereof.

The card 72 includes a strip-like base portion 78, and finger-like extensions, or tabs 80 projecting from one edge thereof. In contrast to the arrangement of the first embodiment, circuit components are not mounted upon the tabs 80. The tabs 80 serve only to fix the positions of the actuating coils 82 along the length of the card. The tabs 80 are received in guideways (not separately designated) inside the bobbins 84 upon which the coils are wound to position the coils and hold them against displacement lengthwise of the card 72 during assembly.

The bobbins 84 are specially shaped for several different purposes. First, their lower faces 86 are grooved so that they fit over the edge of the strip portion 78 of the card and not only restrain translation of the coils 82 out of the plane of the card, but also provide enough of a grip to keep the coils from tipping. Second, they are internally shaped to provide separate axially extending grooves for receiving and positioning the reed switches 32, and the grooves are tapered at their lower ends to guide the leads of the switches accurately and easily into predetermined locations during assembly.

Figure 11:
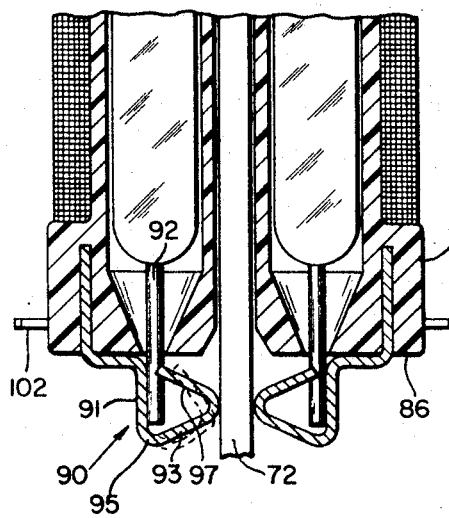
FIGURE 11 is a fragmentary sectional view taken along the line 11—11 of FIGURE 9.
Figure 12:
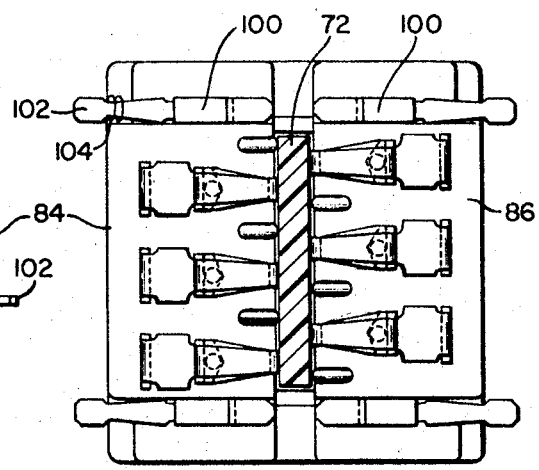
FIGURE 12 is a plan view of a blank, one of which is molded into the bottom of each of the coils shown in FIGURES 9–11 to form terminal lugs secured thereto; and, FIGURE 13 is an isometric view of a "repair package," that is, a unit for replacing, in the field, one of the coil and component sub-assemblies of the module illustrated in FIGURES 9–12.

As perhaps best seen in FIGURE 11, contact lugs 90 are molded or staked into the bobbins 84. They extend from one end of the bobbins 84, and are shaped to be displaced slightly by the printed circuit cards 72 when the coils 82 are placed in position on the card so that the lugs 90 then rest in pressure engagement with the card, making positive contact with terminal pad portions of the printed circuit on the card. Each of the lugs 90 includes an arm portion 91 which is positioned generally tangent and parallel to the lead 92 of the reed switch on the opposite side of the lead from the PC card 72. The arm 91 is initially inclined slightly toward the median line of the bobbin 84 (toward the PC card) so that it is self biased into pressure engagement with the lead 92. An upwardly and inwardly extending arm portion 93 is connected to the lower end of the first arm 91 through a notched bight 95, and, as indicated by dashed lines, terminates at about the median plane of the bobbin 84 prior to mounting of the bobbin on the PC card. The terminal portion 97 of the lug 90 is bent outwardly from the end of the second arm 93 to extend back into engagement with the lead 92. The edge (not separately designated) of the terminal portion 97 is serrated, sharpened, or otherwise shaped for biting or scraping engagement with the lead 92. As the bobbin is mounted on the card, the lug 90 is bent, primarily about the notched bight 95, thus achieving pressure engagement at all the contact points, namely, between the edge of the terminal portion 97 and the lead 92, between the end of the second arm 93 and the PC card 72, and between the first arm 91 and the lead 92. Notching of the bight 95 concentrates the bending at the bight and minimizes any tendency for the lug to bend adjacent to the bobbin 84, which bending might otherwise carry the first arm portion 91 away from the lead 92.

As shown, six of the contact lugs 90 are arranged to connect with leads 92 of reed switches 32 within the bobbins 84. Four additional contact lugs 100 at the corners of the bobbins are formed integrally with flange portions 102 which initially project laterally from the base of the bobbin. Leads 104 from the coil windings are fastened and soldered to the flange portions 102, and may be thereby connected electrically to terminal pads on the panel. Once the coil leads 104 are fastened to the flange portions 102, the flange portions are bent back upon the bobbin 84, thus permitting maximum compactness of construction of the relay module.

The connections to the contact lugs 90 and 100 are thereafter preferably soldered in accordance with recognized practice. This may be done on the automatic basis by dip soldering, immersing the card into the solder bath to a point just below the bottoms of the bobbins 84.

The ends of the bobbins 84 opposite from the ends that rest on the card 72 are formed with axially extending flanges 108, which are notched to receive the wires 110 and 112 that connect the corresponding leads in all the panels of the relay assembly. The notches 114 serve to positon the wires 110 and 112 accurately so that they may be welded by automatic machinery to the component leads 116.

In addition, in the embodiment illustrated, a diode 118 is positioned along one edge of each bobbin 84 between the flanges 108 and between the bobbins and the connecting wires 112. One of the leads of the diode is welded to the wire 112, and the other lead is connected by any desired means to one of the leads of the coil 95. It is thus feasible in this embodiment of the invention to mount six reed switches 32 within each bobbin 84, without having to make the bobbin 84 any larger in cross section than the bobbins 36 of the first described embodiment.

Figure 13:
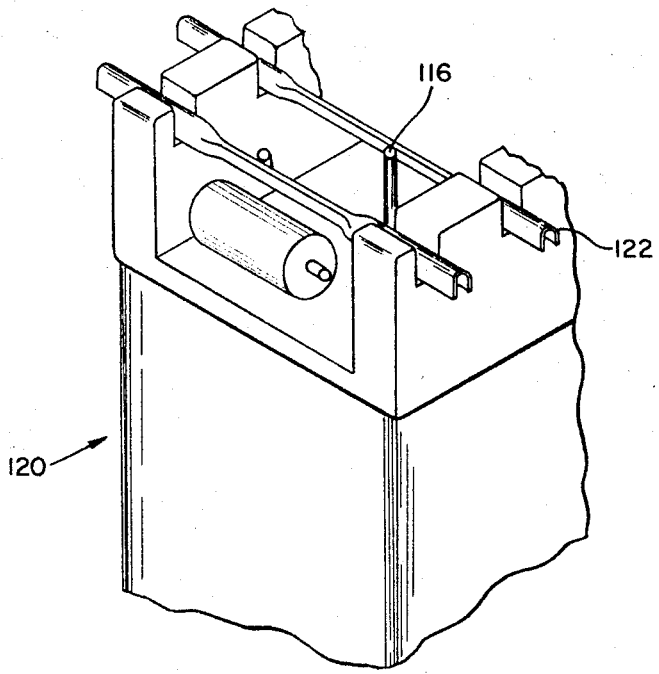

For repair in the field, it is proposed to make special units 120 available as shown in FIGURE 13. The unit 120 is identical to the coil and component assemblies shown in FIGURES 9–12, except that the component leads 116 at the opposite end of the bobbin from the contact lugs 90 and 100 are welded or soldered to clips 122, which project from both sides of the bobbin 84. If, in service, a component should become defective, it is only necessary to cut the connecting wires 110 and 112 at points close to the flanges 108 of the defective unit, unsolder the lugs 90 and 100 from the printed circuit card 72, and remove the defective coil and component sub-assembly from the matrix. The repair unit 120 is then mounted on the card 72 in place of the one removed. Its contact lugs 90 and 100 are soldered to the terminal pads on the card, and the clips 122 are crimped upon and then soldered to the connector wires 110 and 112. Repairs, thus, may be rapidly accomplished with relative ease, and at relatively little expense.

What is claimed is:

1. An electrical switch assembly comprising a unitary printed circuit card having a plurality of finger-like portions projecting in spaced, parallel, juxtaposed array from one edge thereof, conductive lugs fixed to said card adjacent to the edge thereof opposite from said one edge, other lugs fixed to said card adjacent to the distal ends of said fingers, all of said lugs projecting out of the major plane of said card, electrical coils mounted upon and surrounding said finger-like portions and having end terminals received in and secured by selected ones of said lugs, and sealed switch units arranged within said coils generally parallel to said finger-like portions, said units having terminals received by other selected ones of said lugs for both supporting said units and making electrical connections to them.

2. An electrical switch assembly comprising plural unitary printed circuit cards in registered spaced apart parallel array, each of said cards including spaced finger-like portions extending from one edge thereof, conductive lugs fixed on said cards and extending normally thereto, sealed switch units having straight terminal leads, said leads being received by and firmly connected to respective ones of said lugs for mounting said units on said cards, actuating coils fitted over said finger-like portions and including straight terminal leads connected to selected ones of said lugs, portions of selected ones of said lugs extending beyond the distal edges of said finger-like portions, a harp-like array of wires extending across the distal ends of said finger-like portions for electrically connecting aligned sets of said selected lugs and rigidifying the assembly.

3. An electrical switch assembly in accordance with claim 2, wherein said lugs fixed on said cards are in contact with conductive strips thereon, and conductive strips on said cards extend longitudinally therealong and terminate at opposite edges thereof laterally spaced from said finger-like portions, said assembly also including printed circuit cards constituting end panels and fixed to said arrayed printed circuit cards across said opposite edges to form a rigid framework in conjunction with said arrayed cards, said end panels having conductors fixed thereon for interconnecting selected ones of said conductive strips on said arrayed cards that terminate at said opposite edges.

4. An electrical switch assembly comprising plural unitary printed circuit cards in registered spaced apart array, each of said cards including spaced tab portions extending from one edge thereof, electrical coil assemblies mounted on said one edge, each of said coil assemblies including a bobbin, a coil wound upon said bobbin, and circuit components fitted within said bobbin, one end of said bobbin including a wall portion extending normally to the magnetic axis of said coil, said wall portion being shaped to receive a limited edge portion of one of said cards to position the coil assembly on the card, said wall portion having apertures, leads of said components extending through said aperture, and connector means carried by said wall portion for effecting electrical connections between said leads and conductors on the card to which the bobbin is mounted, said bobbin being shaped to receive one of said tab portions, and including registration means engageable with a tab portion received by it for restraining the coil assembly in a predetermined position on the card.

5. An electrical switch assembly in accordance with claim 4, wherein said bobbin includes tapered internal wall portions for guiding the leads of components into said apertures in said normally extending wall portion when the components are inserted into said bobbin from the end thereof opposite from said normally extending wall portion.

6. An electrical switch assembly in accordance with claim 4, wherein said bobbins are of molded construction, and said connector means comprise conductive strips rigidly secured at one end to the bobbins, each of said strips including an axially extending arm lying in a plane generally tangent to one of said apertures, and a portion extending from said tangent plane into contact with the card upon which the bobbin is mounted.

7. An electrical switch assembly in accordance with claim 4, wherein said bobbin also includes flanges at the end opposite from said wall portion, said flanges extending axially relative to the coil and generally parallel to the card on which the bobbin is mounted, said flanges having grooves extending normally to the card, connector wires lying in said grooves and being held in predetermined positions thereby, said connector wires extending across the switch assembly for electrically connecting components associated with different respective cards thereof and for rigidifying the assembly.

References Cited
UNITED STATES PATENTS

| | | | |
|---|---|---|---|
| 3,114,080 | 12/1963 | Koda et al. | 174—68.5 XR |
| 3,114,807 | 12/1963 | Koda | 174—68.5 XR |
| 3,300,686 | 1/1967 | Johnson et al. | |
| 3,340,436 | 9/1967 | Jones et al. | |
| 3,368,115 | 2/1968 | Hoffman. | |

LEWIS H. MYERS, *Primary Examiner.*

J. R. SCOTT, *Assistant Examiner.*

U.S. Cl. X.R.

174—68.5; 335—152